(12) United States Patent
Koohgoli et al.

(10) Patent No.: US 10,628,577 B2
(45) Date of Patent: *Apr. 21, 2020

(54) IDENTIFYING SOFTWARE COMPONENTS IN A SOFTWARE CODEBASE

(71) Applicant: Synopsys, Inc., Mountain View, CA (US)

(72) Inventors: Mahshad Koohgoli, Ottawa (CA); Xiaojun Shen, Kanata (CA); Christopher Potts, Ashton (CA); Aida Malaki, Ottawa (CA)

(73) Assignee: Synopsys, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/296,024

(22) Filed: Oct. 17, 2016

(65) Prior Publication Data

US 2017/0032117 A1 Feb. 2, 2017

Related U.S. Application Data

(63) Continuation of application No. 14/795,559, filed on Jul. 9, 2015, now Pat. No. 9,471,285.

(51) Int. Cl.
*G06F 9/44* (2018.01)
*G06F 9/451* (2018.01)
*G06F 17/00* (2019.01)
*G06F 17/21* (2006.01)
*G06F 21/51* (2013.01)
(Continued)

(52) U.S. Cl.
CPC ............ *G06F 21/51* (2013.01); *G06F 8/71* (2013.01); *G06F 8/75* (2013.01); *G06F 8/751* (2013.01); *G06F 9/54* (2013.01)

(58) Field of Classification Search
CPC ..... G06F 8/65; G06F 8/71; G06F 8/30; G06F 17/3053; G06F 17/30657; G06F 21/10; G06F 21/554; G06F 21/572; G06F 21/64; G06F 21/14; G06F 21/125; G06F 21/121;
(Continued)

(56) References Cited

U.S. PATENT DOCUMENTS 6,668,325 B1 12/2003 Collberg
7,051,200 B1 5/2006 Manferdelli
(Continued)

OTHER PUBLICATIONS

Grechanik et al., Redacting sensitive information in software artifacts, 12 pages (Year: 2014).*
(Continued)

*Primary Examiner* — Thuy Dao
(74) *Attorney, Agent, or Firm* — Sterne, Kessler, Goldstein & Fox P.L.L.C.

(57) ABSTRACT

Systems, methods, and computer program embodiments are disclosed for detecting software components in a software codebase. In an embodiment, a source file containing source code may be received, and a code signature may be generated for the source file based on a determined structure of the source code. The generated code signature may then be compared to signatures stored in a reference database to identify matching software files. In an embodiment, the reference database may store a plurality of code signatures corresponding to software files. A list of the identified software files may be created and presented to a user.

18 Claims, 7 Drawing Sheets

(51) Int. Cl.
*G06F 9/54* (2006.01)
*G06F 8/71* (2018.01)
*G06F 8/75* (2018.01)

(58) Field of Classification Search
CPC ......... G06F 8/315; G06F 9/54; H04L 9/3247; H04L 61/1511; H04L 61/2007
See application file for complete search history.

(56) References Cited

U.S. PATENT DOCUMENTS

| | | | |
|---|---|---|---|
| 7,185,330 B1* | 2/2007 | Khu ..................... | G06F 8/4434 717/152 |
| 7,549,147 B2 | 6/2009 | Futoransky | |
| 7,802,087 B2 | 9/2010 | Gatto | |
| 8,290,962 B1* | 10/2012 | Chu .................. | G06F 17/30622 706/48 |
| 8,498,982 B1 | 7/2013 | Cope | |
| 8,510,726 B2 | 8/2013 | Eisen | |
| 8,819,856 B1* | 8/2014 | Tiffe ..................... | G06F 21/125 726/31 |
| 8,914,674 B2 | 12/2014 | Shah | |
| 8,935,801 B1 | 1/2015 | Pham | |
| 9,049,247 B2* | 6/2015 | Holloway ............ | H04L 61/1511 |
| 2003/0200535 A1* | 10/2003 | McNamara ............. | G06F 9/454 717/137 |
| 2005/0160104 A1* | 7/2005 | Meera ........................ | G06F 8/20 |
| 2006/0236114 A1 | 10/2006 | Yamamoto et al. | |
| 2007/0294179 A1* | 12/2007 | Krawetz ............... | G06F 21/121 705/59 |
| 2008/0244522 A1* | 10/2008 | Bernin ..................... | G06F 8/71 717/122 |
| 2009/0313271 A1 | 12/2009 | Zeidman | |
| 2010/0106705 A1 | 4/2010 | Rush et al. | |
| 2010/0241469 A1 | 9/2010 | Weigert | |
| 2010/0274765 A1* | 10/2010 | Murphy .............. | G06F 11/1451 707/652 |
| 2011/0246968 A1* | 10/2011 | Zhang .................... | G06F 8/751 717/125 |
| 2012/0151600 A1 | 6/2012 | Yun | |
| 2014/0244679 A1 | 8/2014 | Fedorenko et al. | |
| 2015/0248288 A1* | 9/2015 | Murphy ................. | G06F 8/447 717/121 |
| 2015/0301808 A1 | 10/2015 | Goetz | |
| 2015/0378692 A1* | 12/2015 | Dang ....................... | G06F 8/36 717/106 |

OTHER PUBLICATIONS

PCT/US2016/041017, International Search Report, dated Oct. 11, 2016, 3 pages.
PCT/US2016/041017, Written Opinion of the International Searching Authority, dated Oct. 11, 2016, 8 pages.
Extended Europeean Search Report directed to related European Patent Application No. 16844836.3 based on International Patent Application No. PCT/US2016/041017; dated Aug. 5, 2019; 7 pages.

\* cited by examiner

IDENTIFYING SOFTWARE COMPONENTS IN A SOFTWARE CODEBASE

FIELD

Embodiments of the systems and methods described herein are generally related to software and source code analysis.

BACKGROUND

Developers often incorporate third party software or other software modules into software applications and codebases to add desired functionality, reducing the burden to develop particular functionality internally. For example, the growing number of quality open source software products have significantly reduced software development time at minimal cost. However, individuals and organizations making use of third party software must manage quality and security vulnerabilities of the software, as well as ensure compliance with license obligations associated with the software, failure of which may lead to serious financial and legal repercussions.

As the size of a software codebase grows, managing incorporated software components becomes increasingly complicated. For example, third party software may be part of or used by multiple software files within a codebase by virtue of insertion into multiple software components, file duplication, and copy and paste of code segments. Further, software code such as third party code may be modified or adapted for various uses, potentially interspersing e.g. third party code with internally written code. Additionally, small snippets of code, such as malicious code or other vulnerability causing code, may be introduced into a codebase. Manual tracking of software components is insufficient for determining the location or locations of these types of software code, and a robust automated solution is needed to ensure software security and compliance with license obligations.

SUMMARY

Systems, methods, and computer program embodiments are disclosed for detecting software components such as third party software in a software codebase. In an embodiment, a source file containing source code may be received at, e.g., a server, and a code signature maybe generated for the source file based on a determined structure of the source code. The generated code signature may then be compared to other signatures stored e.g. in a reference database to identify matching software files. In an embodiment, the reference database may store a plurality of code signatures corresponding to third party software files. A list of the identified third party software files may be created and presented to a user. In another embodiment, generated code signature may be created for a malicious or vulnerable code snippet and then compared to signatures within a code database to determine if the code snippet is present.

In an embodiment, the code signature for the source file may be generated by first determining a programming language of the source file. A list of language reserved keywords and key phrases associated with the programming language may then be identified. Language-specific control characters and control character sequences may also be identified. Text that does not match a language reserved keyword or key phrase may be removed from the source file. Each remaining keyword and key phrase may then be replaced with a corresponding compact byte representation to produce an encoded sequence. The encoded sequence may be hashed to produce a code signature.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example System

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Frequent illustration using "third party" software or "open source" software may be made, but any software code or component may be detected.

Current solutions to automate the detection of software components, such as third party software or components within a software codebase suffer from limitations that do not address modifications to those files and/or require significant processing power and time. One common method for this detection relies on information embedded within headers of third party software files. For example, open source software files typically include comments or informational lines at the beginning of the file that indicate information such as, but not limited to, copyright and licensing information, file name, open source project name, authorship, and version information. This method requires this information to be present within each open source software file and may not be able to detect the presence of software components when either headers are missing from software files or code segments from software files are incorporated into another file.

Another common method relies on metadata associated with software files, such as but not limited to, file names and file paths. A developer may change file names and locations of files to adapt for use in a software codebase, for example when file naming and folder hierarchy requirements are set. This method is inaccurate in these cases, and further is unable to detect the presence of code segments within another source file.

An approach to detection of third party software components within a software codebase relies on comparison of code samples from the software codebase to source code of third party software files. This method allows for third party code segments within the software codebase to be identified, but may require significant processing time and power, depending on the number of code samples being compared and the uniqueness of each code sample. This method may also be inaccurate when aspects of the third party software code are changed, such as but not limited to, variable, class, and function names. An approach for detection of third party software components within a software codebase is described below that addresses the previously described issues.

Figure 1:
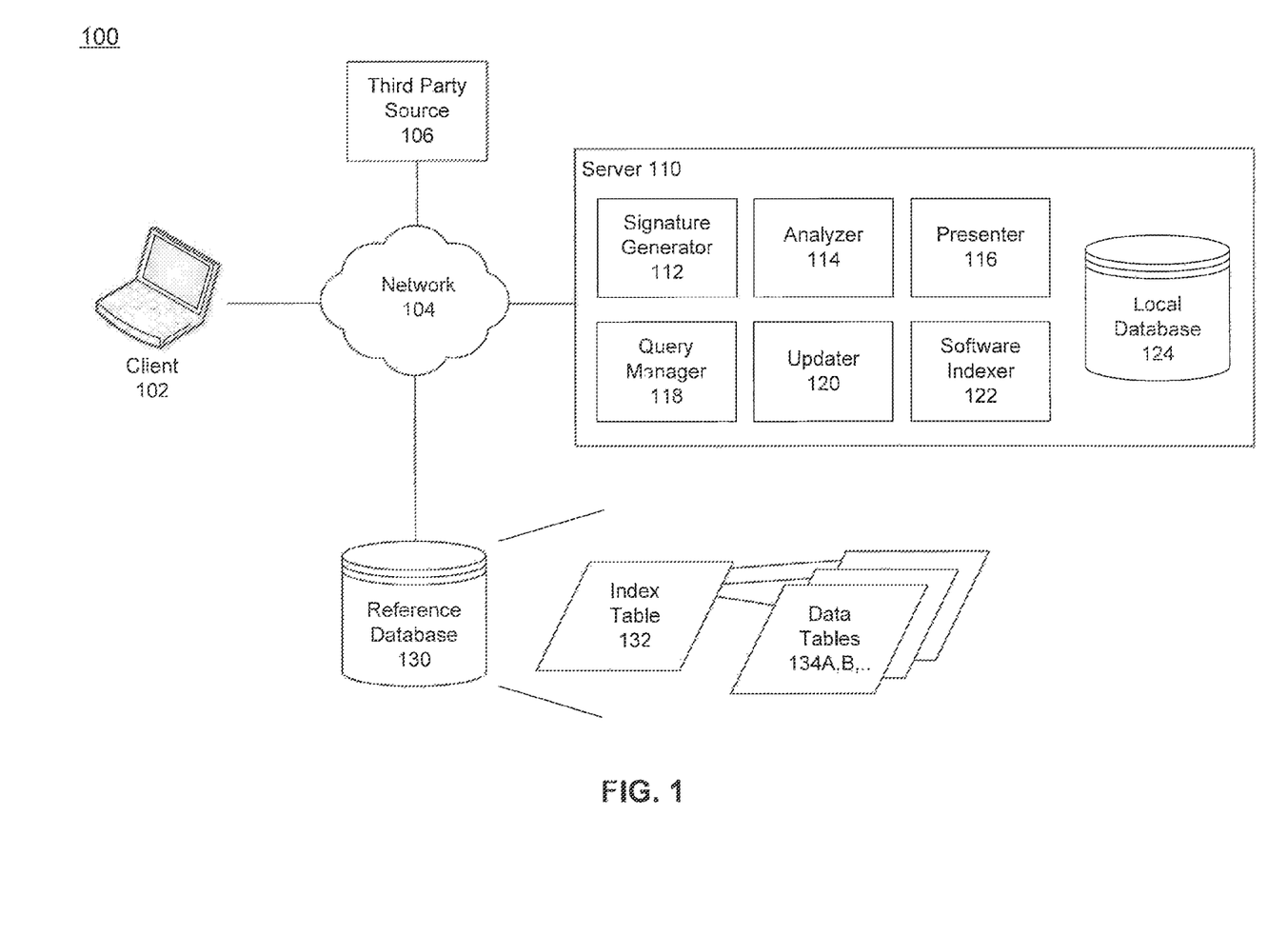
FIG. 1 is a diagram illustrating an example system for detecting software components in a software codebase, according to an embodiment.

FIG. 1 is a diagram illustrating an example system for detecting software components in a software codebase, according to an embodiment. System 100 includes a client device 102 coupled to a server 110 via a network 104. Network 104 may be any type of computer network capable of communicating data, for example, a local area network, a wide area network (e.g., the Internet), or any combination thereof. Client 102 and server 110 may be any type of computing device, including, but not limited to, a desktop, server, mobile device, appliance, or embedded device. In an embodiment, server 110 may include signature generator 112, analyzer 114, presenter 116, query manager 118, updater 120, software indexer 122, and local database 124. Server 110 may also be coupled to reference database 130 and software source 106. Each of the servers and modules in FIG. 1 may be implemented on the same or different computing systems having server functionality, in hardware, software, or any combination thereof.

In an embodiment, software indexer 122 may crawl one or more third party sources in order to discover and retrieve third party software files. For example, software source 106 may be a website hosting an open source software project. In this case, software indexer 122 may retrieve a plurality of software files from software source 106. In an embodiment, a list of known sources may be maintained by server 110. Software indexer 122 may periodically or on demand browse each known third party source in order to retrieve new and updated third party software files.

Once the plurality of software files are retrieved, software indexer 122 may analyze each file to extract and derive identifying file attributes and information. In an embodiment, this information may include, but is not limited to, authorship information, license information and obligations, copyright information, code quality attributes, encryption scheme, file path, and file origin. Signature generator 112 may generate a code signature for each of the software files, as will be discussed in further detail below.

In an embodiment, updater 120 may write the generated code signature, as well as the identifying attributes and information, to a reference database 130. This enables known software files to be identified based on a corresponding code signature and identifying attributes. As illustrated in FIG. 1, reference database 130 may store the data in a plurality of different data tables 134A, B, . . . . To improve performance of database queries and updates, database 130 may also include an index table 132. In an embodiment, updater 120 may query index table 132 to assist with data insertions and updates, and query manager 118 may query index table 132 to assist with data retrieval. In an embodiment, the index table may point to entries in data tables 134, which include the complete individual location points. Or, in an embodiment where the database is de-normalized, the index table may itself include the individual location points in part or in full. In this way, index table 132 may be used to improve performance of database queries and updates.

In an embodiment, a request may be received by server 110 from client 102 to determine one or more software components present in a software codebase. For example, an individual or company may be concerned about legal issues and potential security vulnerabilities associated with using third party code (e.g., open source or commercially purchased software packages) within a developed application codebase. The request may include a plurality of source tiles containing source code or references to a plurality of source files to analyze. If references to source files are received, analyzer 114 may retrieve the actual source files based on the received reference information.

For each received source file, signature generator 112 may generate a code signature for the source file based on the structure and content of the source code contained within the source file. In an embodiment, signature generator 112 may first determine a programming language of the source file. In an embodiment, the programming language may be detected based on the file extension. For example, the file extension "py" may indicate the Python programming language. In an embodiment, the programming language may also be determined through analysis of the file content. For example, aspects of the code structure, such as language-specific reserved keywords, text sequences, or indentation may be compared to known aspects associated with the programming language.

Once a programming language is identified, signature generator 112 may identify a list of language reserved keywords and key phrases associated with the programming language. For example, terms such as "break" and "return" are language reserved keywords in the C programming language. The list of language reserved keywords and key phrases may be stored and maintained in reference database 130, local database 124, or external to reference database 130 and server 110.

Signature generator 112 may then remove text from the source file that does not match an identified language reserved keyword or key phrase. Signature generator 112 may alternately remove anything not matching language-specific control characters and control character sequences from the source file. In an embodiment, a list of identified language reserved keyword or key phrases may similarly be stored and maintained in reference database 130, local database 124, or external to reference database 130 and server 110. The removal of content from the source file that does not match language reserved keywords or key phrases addresses issues associated with, for example, variable, class, and function name changes within the source file, as the code signature no longer relies on naming conventions.

At this point, signature generator 112 may replace each language reserved keyword and key phrase in the source file with an alternative representation, such as a corresponding compact byte representation, to produce an encoded sequence. In an embodiment, each language reserved keyword and key phrase may be mapped to a byte representation, for example a single ASCII character. These mappings may be predefined and stored, for example, in reference database 130 or local database 124, or defined dynamically by signature generator 112. This drastically reduces the size of the encoded sequence for storage and processing. One of skill in the art will appreciate that the corresponding compact byte representations need not be exactly one byte in size, but will typically be smaller in size than the corresponding language reserved keywords and key phrases.

In an embodiment, signature generator 112 may hash the encoded sequence to produce a code signature for the source file. Any available hash function may be used for this purpose, such as but not limited to, MD5, SHA 1, SHA2, RIPEMD, or Whirlpool. Signature generator 112 may generate code signatures for software files in the same manner as described for source files of the software codebase.

The generated code signature enables identification of present software components regardless of basic modifications made to those software components. For example, changes to variable names, function names, or other syntactic changes to text separate from language reserved keywords and key phrases will not affect the identification of software components, as these names do not affect the generated code signature. This may be particularly important when an organization makes use of a code compressor or minifier to reduce file sizes within a software portfolio. For example, code compressors and minifiers often change variable and function names to shorter character representations in order to reduce file size.

Changes to code structure, interspersing of internal code with other software code, and other auto-generated code may be addressed through generation of code signatures for code modules within a source file. A code module may be a portion of the source file determined by the syntax or semantics of the contained source code, for example, a class, function, or other logical division of code. In an embodiment, analyzer 114 may divide the source code of the source file into one or more code modules. Analyzer 114 may use programming language-specific characteristics to determine logical divisions for code modules. In an embodiment, the level of granularity of code modules may be adjusted automatically or by a user. For example, identification of third party software may be optimized by changing the granularity of code modules to represent methods, functions, and code blocks of a particular scope or size, in contrast to encompassing classes and containers.

Once defined, code signature generator 112 may generate code signatures for each of the code modules, as described previously. In an embodiment, the generated code signatures for each of the code modules may be combined to produce a code signature for the source file. In an embodiment, software indexer 122 may similarly divide third party software files into code modules and generate code signatures for each code module.

As described above with respect to software files, in an embodiment, analyzer 114 may parse the source file to determine identifying attributes of the source file, such as but not limited to, authorship information, license information and obligations, copyright information, code quality attributes, encryption scheme, file path, and file origin. Analyzer 114 may then use the generated code signatures for the source file and/or the code modules of the source file, as well as identifying attributes to identify software components present within the source file.

In an embodiment, analyzer 114 may compare the code signature for the source file to code signatures of other software files stored in reference database 130. Analyzer 114 may then create a list of identified software files corresponding to matching code signatures. In an embodiment, the list of identified software files may be stored in local database 124 and/or sent to client 102. In order to identify present software components, according to an embodiment, analyzer 114 may also compare one or more of the generated code signatures for the code modules of the source file to code signatures stored in the reference database. This allows for partial matches of software files to be identified. As previously discussed, this is particularly useful when changes to the structure of a source file have been made, other code has been interspersed with developed code, or code automatically generated by other software is being used.

In an embodiment, local database 126 may store code signatures for matching software files. In this manner, local database 126 may act as a cache for analyzer 114 and query manager 118, obviating the need to query reference database 130 for each subsequent comparison. When comparing code signatures of a source file, analyzer 114 may first compare each code signature to code signatures stored in local database 126 before attempting to query reference database 130.

The code signatures and partial matching procedures, as described above, enable identification of software components within a source file irrespective of particular changes to that software. However, this may lead to false identification of software in some cases. This issue is addressed in multiple ways. First, in an embodiment, one or more thresholds may be used by analyzer 114 to determine whether partial matches indicate the presence of a software component within a source file. For example, if code modules are determined to be very small (e.g., two to three lines of code on average), matching of a single code module signature to a code signature may be coincidental or uninformative. Thresholds may be used to reduce identification of software due to low confidence matches and may specify a percentage (or other quantitative indication) of code signatures for a source file that must match code signatures for a software file. For example, a percentage threshold of 20% may be set to indicate that 20% of the code module signatures for the source file must match code signatures for a third party software file stored in reference database 130 to be identified as a matching third party software file.

Second, in an embodiment, the determined identifying attributes and information of the source file and other software files may be used by analyzer 114 to filter the list of identified other software files. In an embodiment, if inconsistencies are found between specific identifying attributes of the source file and an identified third party software file, analyzer 114 may remove the identified third party software file from the list. For example, differences in authorship, copyright ownership information, and license information may indicate a false match when comparing code signatures of entire tiles, and corresponding third party software files may be removed from the list. In an embodiment, filtering parameters may be adjusted to ensure accuracy of third party software detection while minimizing false positive identification.

Presenter 116 may present the list of identified software file to client 102. In an embodiment, client 102 may be operated by a user, for example, an individual requesting analysis of software files within a software codebase. In various embodiments, the list of identified software files may be presented in a graphical user interface, such as a web page or web application, in a generated report, or via an application programming interface (API). The list of identified software files may include additional information, such as but not limited to, authorship and origin information of each third party file, matching code segments or modules, and various statistics. The list may be combined with list of software files identified for other source files to provide statistics and an overall view of present software components within an entire software codebase.

Figure 2:
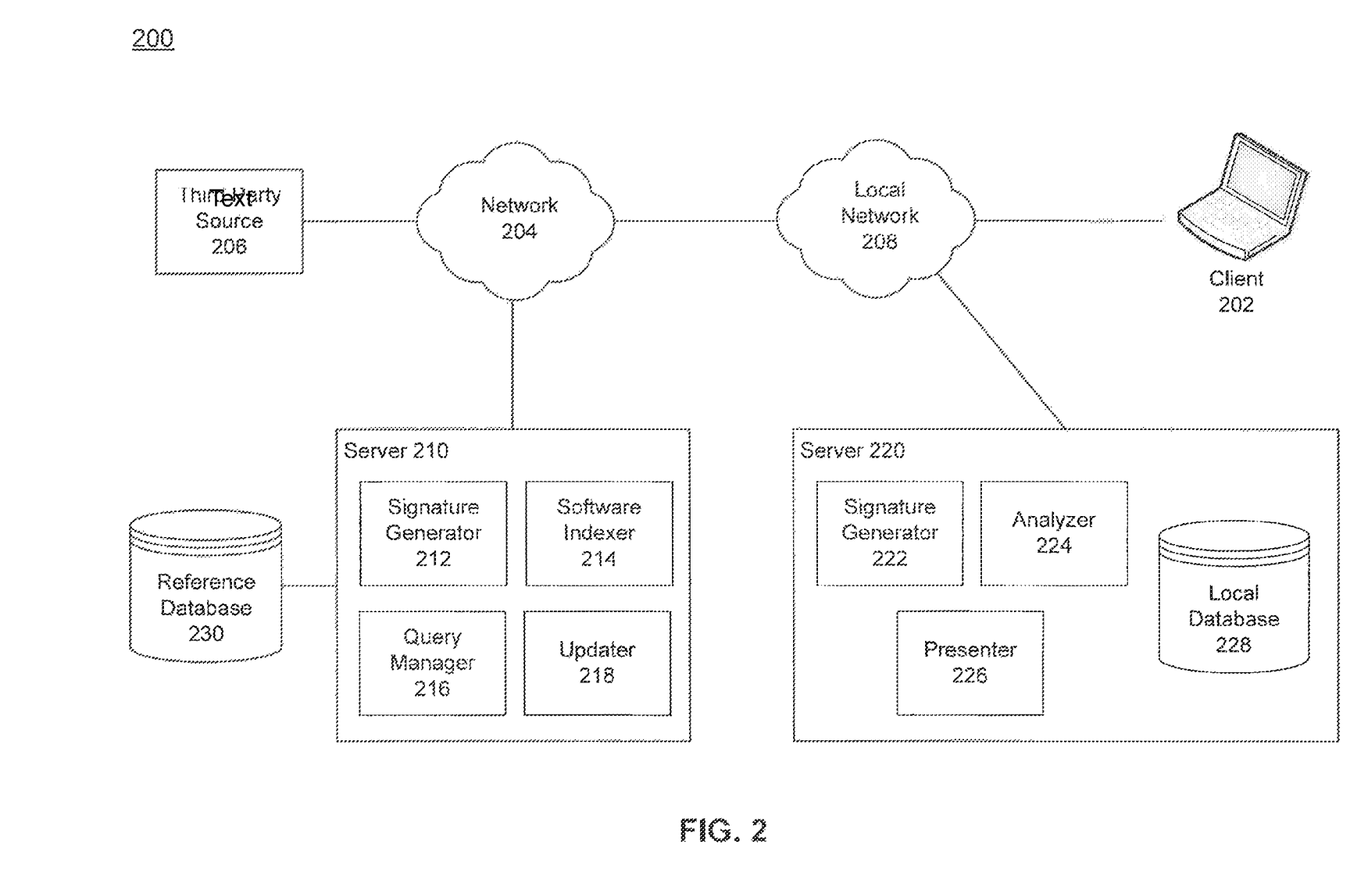
FIG. 2 is a diagram further illustrating an example system for detecting software components in a software codebase, according to an embodiment.

FIG. 2 is a diagram further illustrating an example system for detecting software components in a software codebase, according to an embodiment. System 200 includes a client device 202 coupled to a server 220 via a local area network 208, for example an enterprise network. Local area network 208 may be coupled to network 204. Network 204 may be any type of computer network capable of communicating data, for example, a local area network, a wide area network (e.g., the Internet), or any combination thereof. Network 204 may further be coupled to source 206 and a server 210, which may in turn be coupled to reference database 230. Client 202, source 206, and reference database 230 may be similar to client 102, source 106, and reference database 130 of FIG. 1, respectively.

Server 210 may include signature generator 212, software indexer 214, query manager 216, and updater 218. Software indexer 214, query manager 216, and updater 218 may perform tasks similar to software indexer 122, query manager 118, and updater 120 of FIG. 1, respectively. Signature generator 212 may perform tasks similar to signature generator 112 of FIG. 1 with respect to signature generation for software files.

Server 220 may include signature generator 222, analyzer 224, and presenter 226. Analyzer 224 and presenter 226 may perform tasks similar to analyzer 114 and presenter 116 of FIG. 1, respectively. Signature generator 222 may perform tasks similar to signature generator 112 of FIG. 1 with respect to signature generation for source files within a software codebase. Each of the servers and modules in FIG. 2 may be implemented on the same or different computing systems having server functionality, in hardware, software, or any combination thereof.

The embodiment illustrated in FIG. 2 may represent detection of third party software components within software residing in a home, office, or enterprise environment. In this case, analysis of internal source code may occur within local area network 208, which may be a private network, preventing transmission of internal data over a public network. In an embodiment, local area network 208 may be part of a larger private wide area network connecting multiple sites of an enterprise. Retrieval and preparation of third party software files for comparison may occur outside of the home, office, or enterprise environment, and transmission between network 204 and local area network 208 may be limited to, for example, signatures and attributes of known third party software files.

Figure 3:
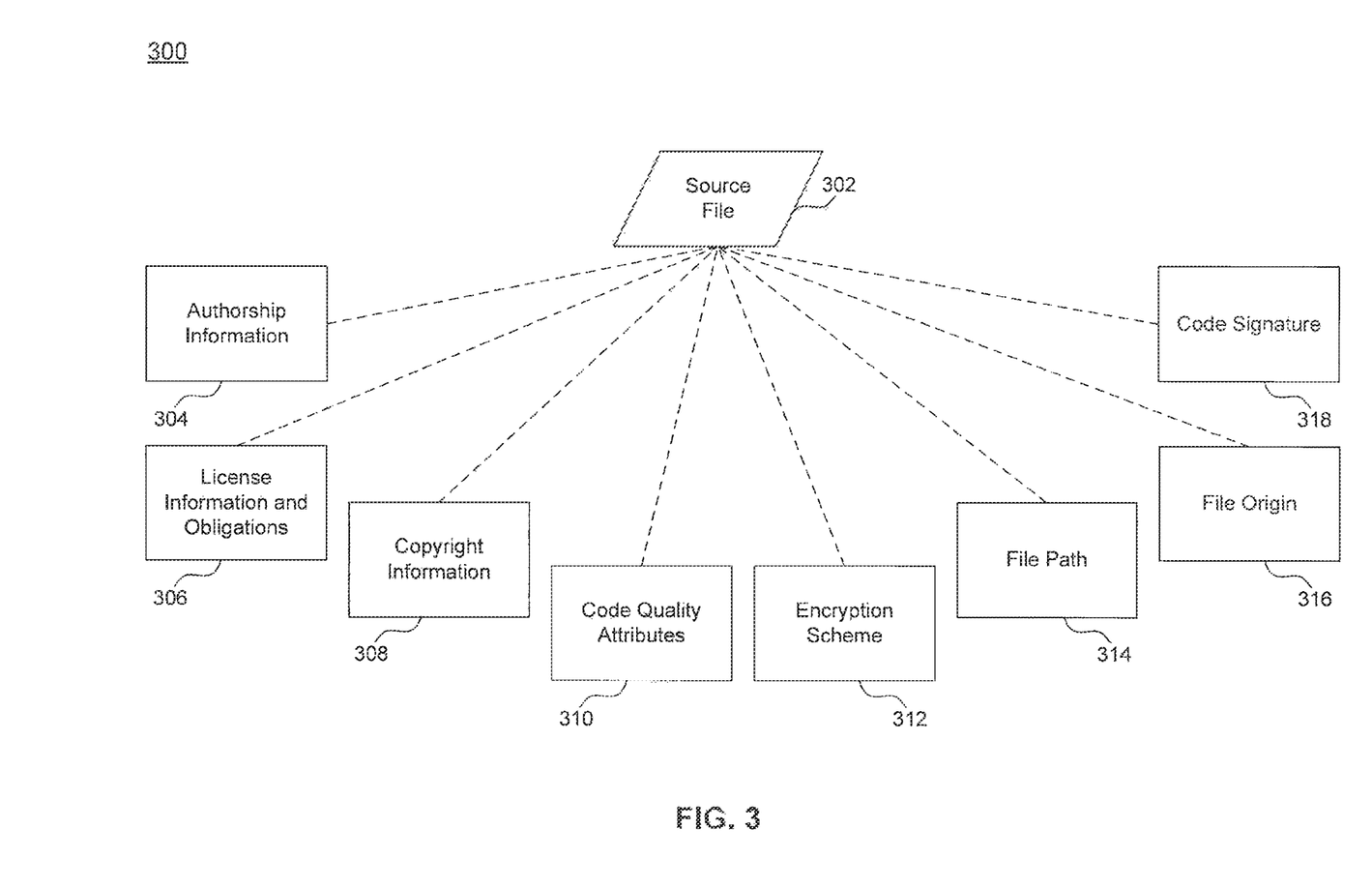
FIG. 3 is a diagram illustrating example data and information derived from a source file for use in detecting software components, according to an embodiment.

FIG. 3 is a diagram illustrating example data and information derived from a source file for use in detecting software components, according to an embodiment. As described previously, a source file 302 may be analyzed, for example by analyzer 114 of FIG. 1, to extract or derive identifying attributes 304-316 of source file 302. A code signature 318 for source file 302 may also be generated, for example by signature generator 112 of FIG. 1. Source file 302 may be a third party software file or a source file of a software codebase internal to an organization or owned by one or more individuals. Identifying attributes 304-316 and code signature 318 may be used to detect such third party software components or other source files within source file 302, as previously described.

In an embodiment, identifying attributes that may be extracted or derived from source file 302 may include, but are not limited to, authorship information 304, license information and obligations 306, copyright information 308, code quality attributes 310, encryption scheme 312, file path 314, and file origin 316.

Authorship information 304 may include individuals or organizations contributing to authorship of source file 302. License information and obligations may include any license information incorporated into the content or metadata of source file 302. For example, source files adhering to open source licenses, such as the GNU General Public License (GPL) or MIT License, may have information about and terms of the license incorporated into the source file. In a further example, the license name and license terms may be extracted from source file 302 as identifying information.

Copyright information 308 may include any copyright information incorporated into the content or metadata of source file 302. For example, the content of a source file often contains a copyright symbol or the explicit term "copyright." Associated text may be extracted as an identifying attribute of source file 302.

Code quality attributes 310 may include explicit or derived indications of issues within source file 302. For example, source file 302 may contain a comment indicating a limitation or bug within the source code contained in the source file. Code quality attributes may also be derived through analysis of source file 302, for example security vulnerabilities determined through source code analysis. Another example may include analysis of the number of code lines against the number of comment lines in source file 302 to determine the documentation quality of source file 302. Yet another example may include analysis of variable definitions in relation to variable usage (e.g., checking for variable definitions prior to usage) to determine potential runtime issues. Code quality attributes 310 may be used for purposes beyond detection of third party software components within a software codebase.

If source file 302 has been encrypted, encryption scheme 312 may include identifying encryption information found in the content, metadata, or through analysis of source file 302. File path 314 may indicate a location of source file 302 within a directory structure. File origin 316 may include information related to the origin of source file 302, such as but not limited to, a network address, for example a uniform resource locator (URL) or Internet Protocol (IP) address, of where source file 302 was retrieved from and the name of a project which source file 302 belongs to, for example in the case that source file 302 is part of an open source project.

Example Method

Figure 4:
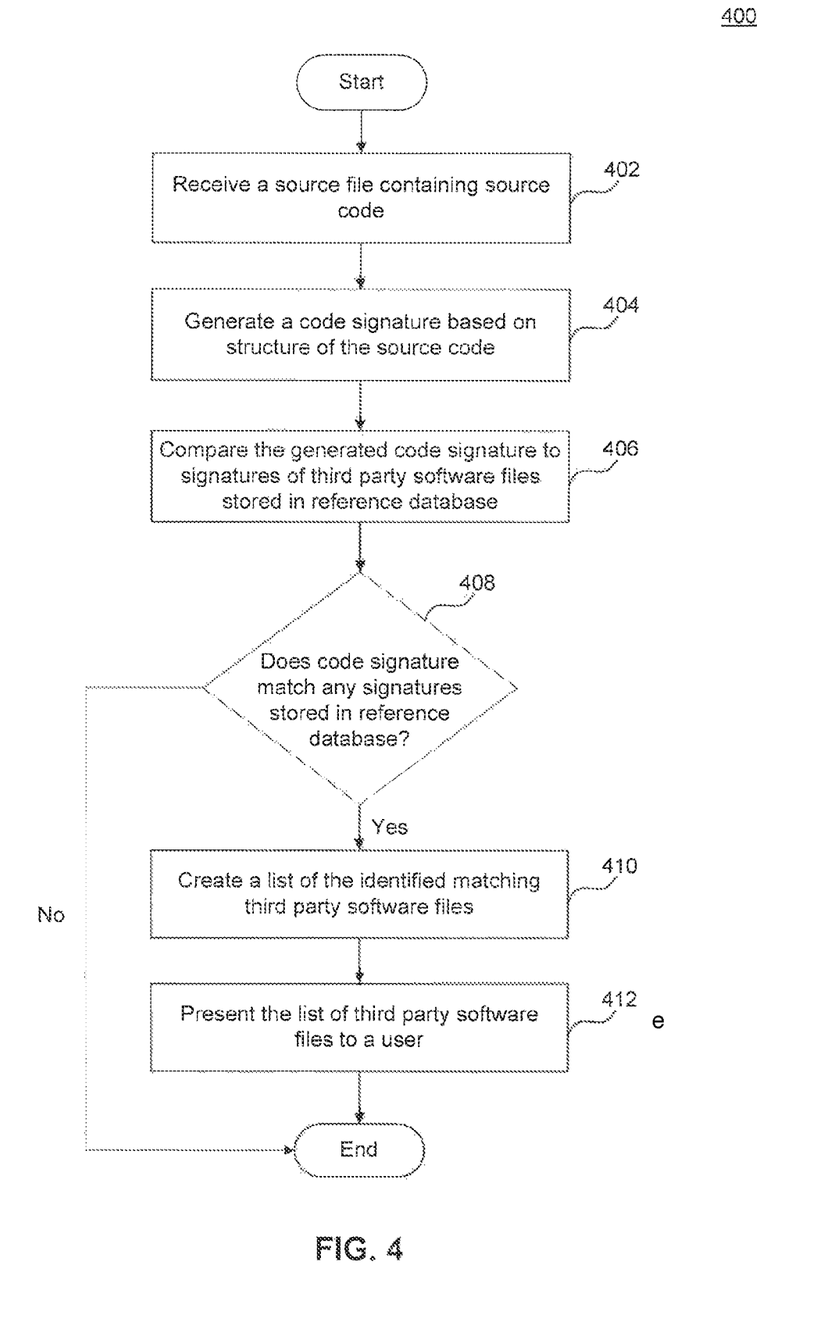
FIG. 4 is an example method for detecting software components within a source file, according to an embodiment.

FIG. 4 is an example method for detecting software components such as third party code within a source file, according to an embodiment. As previously described, detection of third party software files may be particularly important for individuals or companies concerned about legal issues and potential security vulnerabilities associated with using third party code. Method 400 begins at stage 402 by receiving a source file containing source code at a server. At stage 404, a code signature for the source file may be generated based on a determined structure of the source code, further details of which are described with respect to FIGS. 1 and 5.

At stage 406, the generated code signature may be compared to code signatures stored in a reference database, such as reference database 130 of FIG. 1, to identify matching software files. The reference database may store a plurality of code signatures corresponding to known software files such as third party software files. In an embodiment, third party software files may be retrieved and analyzed by a software indexer, such as software indexer 122 of FIG. 1. The software indexer may extract and derive identifying attributes for retrieved third party software files, and a signature generator, such as signature generator 112 of FIG. 1, may generate a code signature for each third party software file. The identifying attributes and code signatures of third party software files may be written to the reference database.

At stage 408, it is determined whether the generated code signature matches any of the code signatures stored in the reference database. If no matches are found, the method ends. If one or more matches are found, at stage 410, a list may be created of identified third party software files corresponding to matching code signatures in the reference database. In an embodiment, stages 406-410 may be repeated using generated code module signatures for the source file. For example, if no matches are found at stage 408 when comparing the code signature for the complete source file to code signatures stored in the reference database, stages 406-410 may be executed for each generated code module signature for the source file. Code module signatures for the source file may be generated as described with respect to FIG. 1. This allows for software files to be identified based on partial file matches. At stage 412, the created list of identified third party software files may be presented to a user, for example in a graphical user interface, a generated report, or via an API.

Figure 5:
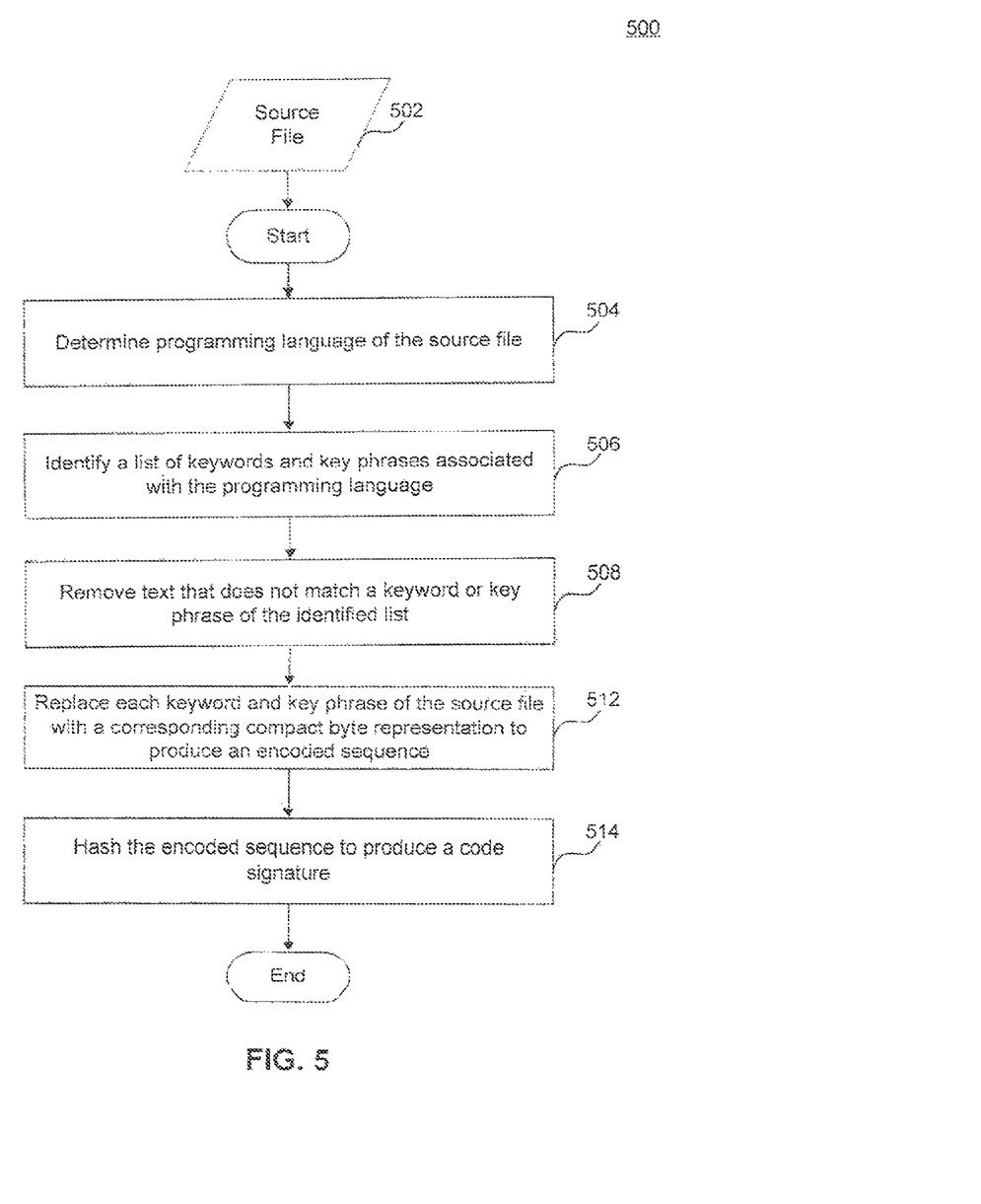
FIG. 5 is an example method for generating a code signature for a source file, according to an embodiment.

FIG. 5 is an example method for generating a code signature for a source file 502, according to an embodiment. Method 500 begins at stage 504 by determining a programming language of the source file. In an embodiment, the programming language may be detected based on the file extension. For example, the file extension "py" may indicate the Python programming language. In an embodiment, the programming language may also be determined through analysis of the file content. For example, presence of unique language-specific reserved keywords, or aspects of the code structure, such as text sequences or indentation may be compared to known aspects associated with the programming language.

At stage 506, a list of language reserved keywords and key phrases associated with the programming language is identified. For example, terms such as "break" and "return" are language reserved keywords in the C programming language. In an embodiment, the list of language reserved keywords and key phrases may be stored and maintained in a reference database, such as reference database 130 of FIG. 1, or a local database, such as local database 124 of FIG. 1.

At stage 508, text that does not match a language reserved keyword or key phrase of the identified list is removed from the source file. The removal of content from the source file that does not match language reserved keywords or key phrases addresses issues associated with, for example, variable, class, and function name changes within the source file, as the code signature no longer relies on naming conventions.

At stage 512, each language reserved keyword and key phrase of the source file is replaced with a corresponding compact byte representation to produce an encoded sequence. In an embodiment, each language reserved keyword and key phrase may be mapped to a byte representation, for example a single ASCII character. These mappings may be predefined or defined dynamically. This drastically reduces the size of the encoded sequence for storage and processing. As described previously, one of skill in the art will appreciate that the corresponding compact byte representations need not be exactly one byte in size, but will typically be smaller in size than the corresponding language reserved keywords and key phrases. Stage 512 may be repeated for individual modules within the source file to create additional code sequences for those individual modules. Individual modules in a source file may be, for example, classes, functions, subroutines, or blocks of a predetermined number of lines of code, as described with respect to FIG. 1. In this manner, creation of code sequences for individual modules may then represent code snippets within a source file.

Finally, at stage 514, the encoded sequences are hashed to produce code signatures for the source file including, in an embodiment, code signatures for individual modules of the source file. Any available hash function may be used for this purpose, such as but not limited to, MD5, SHA1, SHA2, RIPEMD, or Whirlpool.

Figure 6:
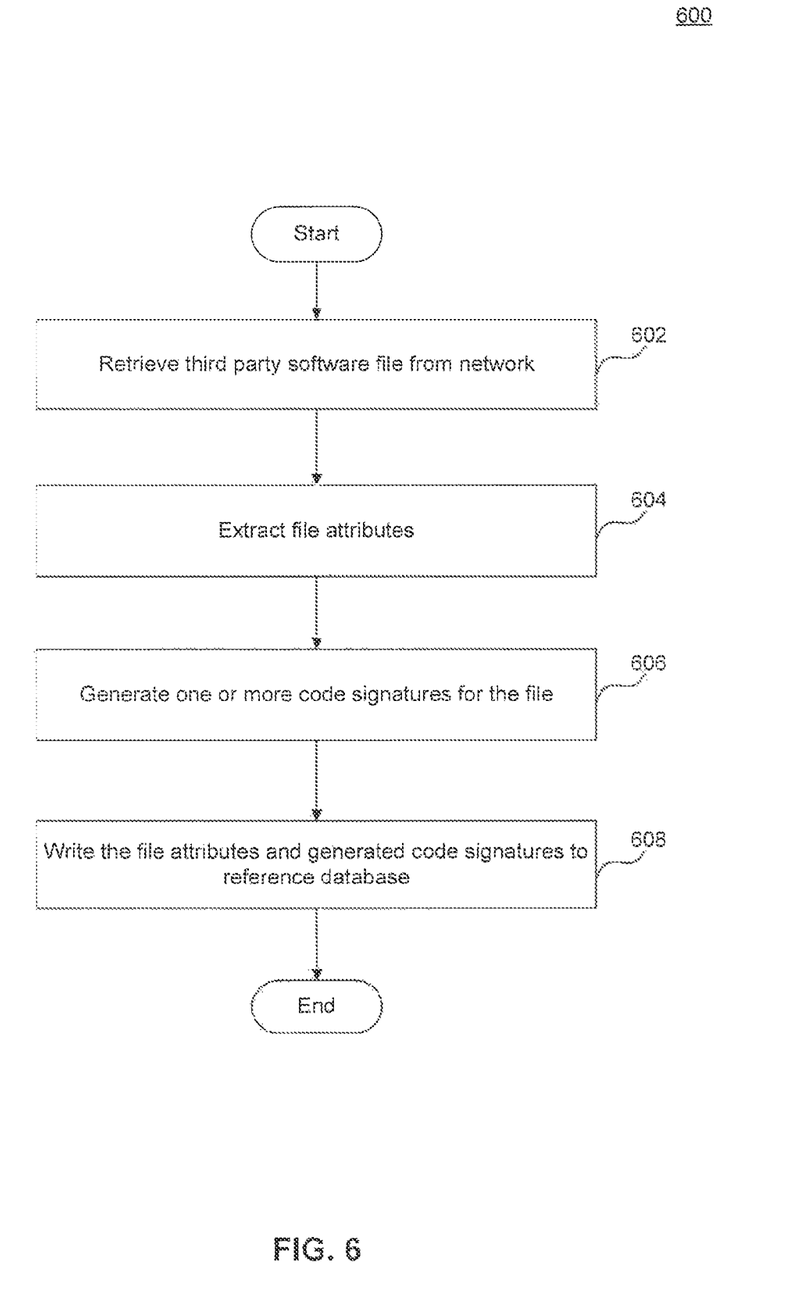
FIG. 6 is an example method for retrieving and indexing software data for use in detecting software components in a software codebase, according to an embodiment.

FIG. 6 is an example method for retrieving and indexing third party software data for use in detecting third party software components in a software codebase, according to an embodiment. Method 600 begins at stage 602 by retrieving a third party software file from a network, such as the Internet. In an embodiment, a software indexer, such as software indexer 122 of FIG. 1, may crawl one or more third party sources in order to retrieve the third party file, as described further with respect to FIG. 1.

At stage 604, file attributes may then be extracted or derived from the third party software file. These attributes may be used in determining the presence of the third party software file or contained software components within a software codebase. In an embodiment, file attributes extracted or derived from the source file may include, but are not limited to, authorship information, copyright ownership information, license information, license obligations, encryption scheme, file path, and file origin, as previously described in further detail.

In an embodiment, certain identifying attributes, for example license information and license obligations, may be extracted or derived from files related to the third party software file. For example, license information may be stored in a separate file within a folder hierarchy in which the third party software file resides. In an embodiment, the folder hierarchy in which the third party software file resides may be scanned to identify additional files that may contain identifying attributes for the third party software file. These additional files may then be analyzed to extract or derive identifying information.

At stage 606, one or more code signatures may be generated for the third party software file. In an embodiment, code signatures may be generated in the same manner as described with respect to FIG. 5. The code signatures may similarly be used to determine the presence of the third party software file or contained software components within a software codebase.

Finally, at stage 608, the extracted and derived file attributes and the generated code signatures may be written to a reference database, such as reference database 130 of FIG. 1.

Example Computer System

Figure 7:
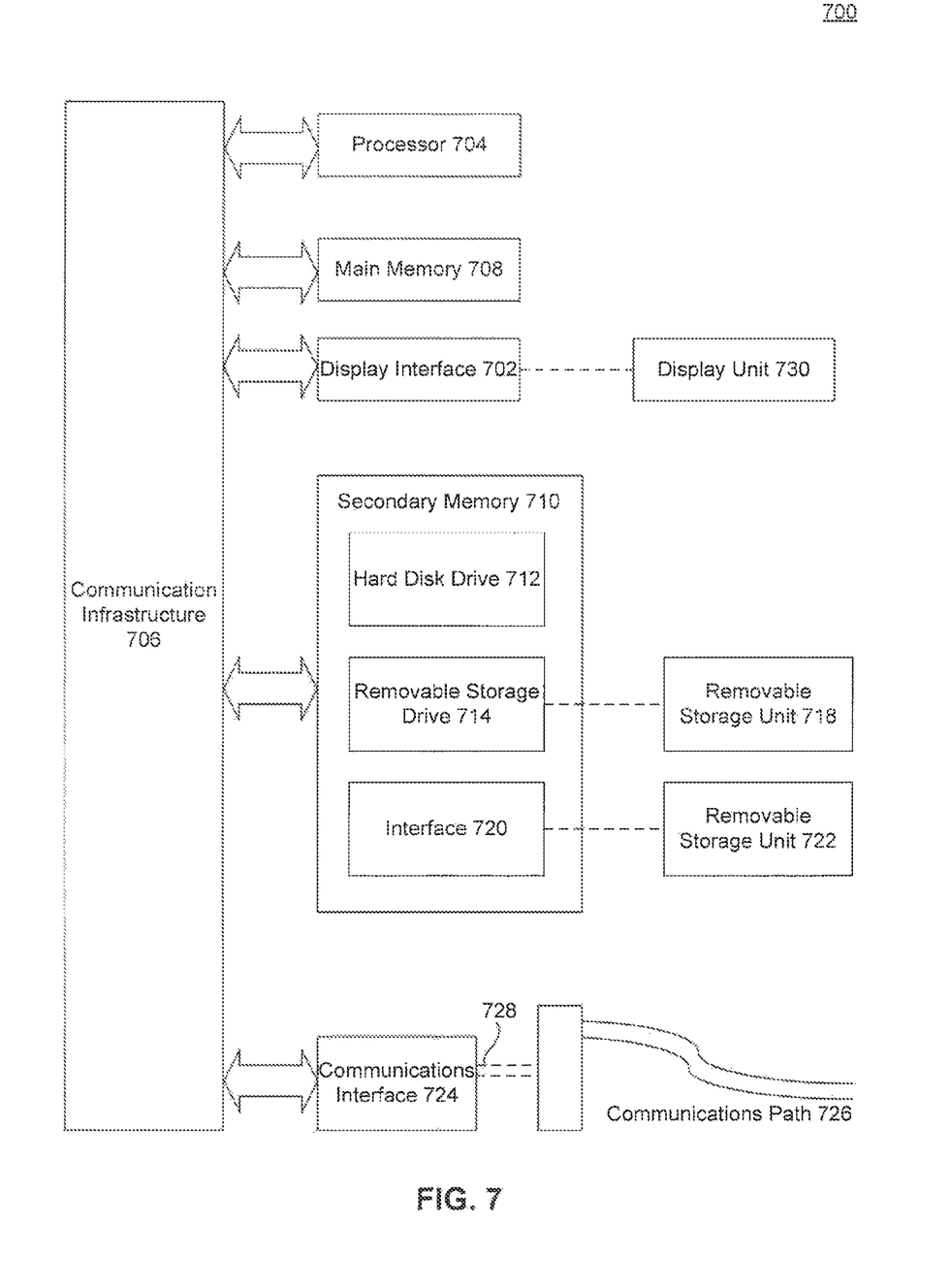
FIG. 7 is a diagram illustrating an example computing device, according to an embodiment.

FIG. 7 is an example computing system useful for implementing various embodiments. Various embodiments can be implemented, for example, using one or more well-known computer systems, such as computer system 700. Computer system 700 can be any well-known computer capable of performing the functions described herein, such as computers available from International Business Machines. Apple, Sun, HP, Dell, Sony, Toshiba, etc.

Computer system 700 includes one or more processors (also called central pressing units, or CPUs), such as a processor 704. Processor 704 may be connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 7. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents.

We claim:

1. A system comprising:
   one or more computing devices;
   a reference database storing reference information comprising a code signature corresponding to a software file;
   a signature generator implemented on the one or more computing devices and configured to:
      receive an original source file comprising source code;
      determine a programming language of the source code in the original source file;
      create an updated source file from a first portion of the original source file corresponding to a predetermined character sequence specific to the determined programming language, wherein a second portion of the original source file is omitted from the updated source file;
      replace one or more language keywords or key phrases with a representation in the updated source file to produce an encoded sequence, wherein the representation is a compact byte representation smaller in size than the corresponding language reserved keywords or key phrases; and
      generate an updated code signature based at least in part on content of the updated source file; and
   an analyzer implemented on the one or more computing devices and configured to:
      perform a comparison of the generated updated code signature with the code signature from the reference information stored in the reference database;
      identify, based on the comparison, a matching code signature from within the software file corresponding to the source file; and
      add an entry, corresponding to the matching code signature, to a list of identified software files.

2. The system of claim 1, wherein the code signature comprises a hash of the encoded sequence.

3. The system of claim 1, wherein the signature generator is further configured to:
   divide the source code of the original source file into a first code module and a second code module; and
   generate a first code signature corresponding to the first code module and a separate second code signature corresponding to the second code module.

4. The system of claim 3, wherein the signature generator is further configured to:
   aggregate the first and second code signatures into the code signature for the updated source file.

5. The system of claim 3, wherein the analyzer is further configured to:
   compare the first and second code signatures to the code signature stored in the reference database to identify a further match in the software file to the original source file.

6. The system of claim 1, wherein the signature generator is further configured to:
   parse the original source file to determine an identifying attribute.

7. The system of claim 6, wherein the analyzer is further configured to:
   utilize the identifying attributes to identify a further match.

8. The system of claim 6, wherein the identifying attributes of the original source file comprise at least one of authorship information, copyright ownership information, license information, license obligations, encryption scheme, code quality attributes, or file origin.

9. The system of claim 6, wherein the identifying attribute of the original source file comprises at least one of authorship information, copyright ownership information, license information, license obligations, encryption scheme, code quality attributes, or file origin.

10. The system of claim 1, wherein the reference database is accessible via an application programming interface (API).

11. A method, comprising:
    receiving, by at least one computer processor, an original source file comprising source code;
    determining, by the at least one computer processor, a programming language of the source code in the original source file;
    creating, by the at least one computer processor, an updated source file from a first portion of the original source file corresponding to a predetermined character sequence specific to the determined programming language, wherein a second portion of the original source file is omitted from the updated source file;
    replacing, by the at least one computer processor, one or more language keywords or key phrases with a representation in the updated source file to produce an encoded sequence, wherein the representation is a compact byte representation smaller in size than the corresponding language reserved keywords or key phrases;
    generating, by the at least one computer processor, an updated code signature based at least in part on content of the updated source file;
    performing, by the at least one computer processor, a comparison of the generated updated code signature with the code signature from reference information stored in a reference database comprising a code signature corresponding to a software file;
    identifying, by the at least one computer processor, based on the comparison, a matching code signature from within the software file corresponding to the source file; and
    adding an entry, by the at least one computer processor, corresponding to the matching code signature, to a list of identified software files.

12. The method of claim 11, wherein the generating the code signature comprises:
    hashing, by the at least one computer processor, the encoded sequence to produce at least part of the code signature.

13. The method of claim 11, further comprising:
    dividing, by the at least one computer processor, the source code of the original source file into a first code module and a second code module; and
    generating, by the at least one computer processor, a first code signature corresponding to the first code module and a separate second code signature corresponding to the second code module.

14. The method of claim 13, further comprising:
    aggregating, by the at least one computer processor, the first and second code signatures into the code signature for the updated source file.

15. The method of claim 13, further comprising:
    comparing, by the at least one computer processor, the first and second code signatures to the code signature stored in the reference database to identify a further match in the software files to the original source file.

16. The method of claim 11, further comprising:
parsing, by the at least one computer processor, the original source file to determine an identifying attribute.

17. The method of claim 16, further comprising:
utilizing the identifying attribute to identify a further match.

18. The method of claim 16, wherein the identifying attribute of the original source file comprises at least one of authorship information, copyright ownership information, license information, license obligations, encryption scheme, code quality attributes, or file origin.

\* \* \* \* \*